US012792753B2

(12) United States Patent
Thirkell

(10) Patent No.: US 12,792,753 B2
(45) Date of Patent: *Nov. 10, 2026

(54) SYSTEMS AND METHODS FOR MANAGING ACCESS CREDENTIAL REQUESTS

(71) Applicant: Xero Limited, Wellington (NZ)

(72) Inventor: Justin Thirkell, Wellington (NZ)

(73) Assignee: Xero Limited, Te Aro (NZ)

( * ) Notice: Subject to any disclaimer, the term of this patent is extended or adjusted under 35 U.S.C. 154(b) by 28 days.

This patent is subject to a terminal disclaimer.

(21) Appl. No.: 18/926,284

(22) Filed: Oct. 24, 2024

(65) Prior Publication Data

US 2025/0045428 A1 Feb. 6, 2025

Related U.S. Application Data

(63) Continuation of application No. 17/693,301, filed on Mar. 11, 2022, now Pat. No. 12,153,691.

(30) Foreign Application Priority Data

Aug. 25, 2021 (NZ) ............................... 2021/050150

(51) Int. Cl.
*G06F 21/60* (2013.01)

(52) U.S. Cl.
CPC .... *G06F 21/604* (2013.01); *G06F 2221/2101* (2013.01); *G06F 2221/2141* (2013.01)

(58) Field of Classification Search
CPC ..... G06F 2221/2101; G06F 2221/2141; G06F 21/604

(Continued)

(56) References Cited

U.S. PATENT DOCUMENTS 5,793,952 A 8/1998 Limsico
9,998,922 B2 * 6/2018 Robinton .............. H04W 12/06

(Continued)

OTHER PUBLICATIONS

International Search Report and Written Opinion as issued in connection with International Patent Application No. PCT/NZ2021/050150, mailed Dec. 27, 2021, 15 pages.

(Continued)

*Primary Examiner* — Amare F Tabor
(74) *Attorney, Agent, or Firm* — Young Basile Hanlon & MacFarlane, P.C.

(57) ABSTRACT

Described embodiments relate to a computer-implemented method comprising: receiving, from an authorisation server, an access credentials read request associated with a user. The access credentials read request comprises one or more access credential identifiers and one or more parameter values, wherein the one or more parameter values are derived from a current state of a set of requirements for authorising modifications to access credentials. The method further comprises traversing a first event log associated with the user to determine one or more access credential values associated with the respective one or more access credential identifiers based on the one or more parameter values and transmitting, to the authorisation server, the one or more access credential values. The method further comprises, responsive to receiving, from the authorisation server, an access credentials modification request comprising one or more modified access credential values: creating a first event object comprising the one or more modified access credential values; and appending the first event object to the first event log.

20 Claims, 8 Drawing Sheets

(58) Field of Classification Search
USPC .............................................................. 726/5
See application file for complete search history.

(56) References Cited

U.S. PATENT DOCUMENTS

| | | | |
|---|---|---|---|
| 11,334,661 | B1 | 5/2022 | Brandwine et al. |
| 11,463,426 | B1 * | 10/2022 | Wheeler ............... H04L 63/102 |
| 2008/0022379 | A1 | 1/2008 | Wray |
| 2011/0214133 | A1 | 9/2011 | Lum et al. |
| 2014/0282929 | A1 * | 9/2014 | Tse ..................... G07C 9/00309 726/5 |
| 2015/0195278 | A1 * | 7/2015 | Plotkin ............... H04L 63/0861 713/186 |
| 2016/0072840 | A1 | 3/2016 | Iyer et al. |
| 2017/0237729 | A1 | 8/2017 | Uppalapati |
| 2017/0308695 | A1 | 10/2017 | Adams et al. |
| 2018/0004934 | A1 | 1/2018 | Venkataramani |
| 2018/0247049 | A1 | 8/2018 | Fang et al. |
| 2019/0349354 | A1 * | 11/2019 | Baumgarte ........... H04L 9/3228 |
| 2020/0151323 | A1 | 5/2020 | Kras |
| 2020/0250172 | A1 | 8/2020 | Busjaeger et al. |
| 2021/0334357 | A1 | 10/2021 | Woo |
| 2022/0020234 | A1 * | 1/2022 | Schoenfelder .......... H04L 63/08 |

OTHER PUBLICATIONS

International preliminary report on patentability as issued in connection with International Patent Application No. PCT/NZ2021/050150, mailed Feb. 27, 2024, 12 pages.

Non-Final Office Action in U.S. Appl. No. 17/693,301, dated Apr. 25, 2024, 6 pages.

Notice of Allowance in U.S. Appl. No. 17/693,301, dated Jul. 24, 2024, 5 pages.

Extended European search report as issued in connection with EP Patent Application No. 21955188.4, mailed Sep. 13, 2024, 8 pages.

* cited by examiner

100A

100B

400

SYSTEMS AND METHODS FOR MANAGING ACCESS CREDENTIAL REQUESTS

TECHNICAL FIELD

Described embodiments relate to systems, computer-implemented methods and computer programs for managing access credential requests.

BACKGROUND

Many application servers and service providers rely on authorisation servers to facilitate authentication or verification of an entity, such as an individual or a company, attempting to access a resource server or network using user credentials.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a computer-implemented method comprising a computer-implemented method comprising: receiving, from an authorisation server, an access credentials read request associated with a user, the access credentials read request comprising one or more access credential identifiers and one or more parameter values, wherein the one or more parameter values are derived from a current state of a set of requirements for authorising modifications to access credentials; traversing a first event log associated with the user to determine one or more access credential values associated with the respective one or more access credential identifiers based on the one or more parameter values; transmitting, to the authorisation server, the one or more access credential values; responsive to receiving, from the authorisation server, an access credentials modification request comprising one or more modified access credential values: creating a first event object comprising the one or more modified access credential values; and appending the first event object to the first event log.

The first event log may comprise a historical record of prior modifications to one or more access credentials associated with the user, each of which occurred prior to setting of the current state of the set of requirements for authorising modifications to access credentials.

In some embodiments, the method further comprises: creating a second event object indicative of a credentials read request; and appending the second event object to a second event log associated with the user.

In some embodiments, the method further comprises: responsive to receiving a failure notification indicative of a failed attempt to modify the one or more access credential values: creating a third event object indicative of the failed attempt; and appending the third event object to a second event log associated with the user. The second event log may be the first event log, or may be a different event log to the first event log.

Some embodiments relate to a computer-implemented method comprising: receiving, from an authorisation server, an access credentials request associated with a user, the access credentials request comprising one or more access credential identifiers, one or more associated modified access credential values, and the current state of the set of requirements for authorising modifications to access credentials; traversing a first event log associated with the user to determine one or more access credential values associated with each of the respective one or more access credential identifiers, wherein the one or more access credential values are determined based on one or more parameter values derived from the current state of the set of requirements for authorising modifications to access credentials; responsive to determining that the one or more modified access credential values comply with the current state of requirements: transmitting, to the authorisation server, a response approving the credential modification request; creating a first event object comprising the one or more modified access credential values; and appending the first event object to the first event log; and responsive to determining that the one or more modified access credential values do not comply with the current state of requirements, transmitting, to the authorisation server, a response denying the credential modification request.

In some embodiments, responsive to determining that the one or more modified access credential values do not comply with the current state of requirements, the method further comprises: creating a second event object indicative of the failed attempt to modify the access credentials; and appending the second event object to a second event log associated with the user. The second event log may be the first event log, or may be a different event log to the first event log.

Some embodiments relate to a computer-implemented method comprising: receiving, at an authorisation server, a first request to modify a current state of a set of requirements for authorising modifications to access credentials, the request comprising a proposed set of requirements; modifying the current state of the set of requirements to the proposed set of requirements; receiving, at the authorisation server, an access credential modification request, the access credential modification request comprising one or more access credential identifiers and associated modified access credential values; providing, to an event logging engine, an access credentials read request associated with a user, the access credentials read request comprising the one or more access credential identifiers and one or more parameter values, wherein the one or more parameter values are derived from modified current state of the set of requirements; receiving, from the event logging engine, one or more access credential values associated with the one or more access credential identifiers; determining, by the authorisation server, whether the one or more modified values for the respective one or more access credentials comply with the modified current state of the set of requirements based on the received one or more access credential values; responsive to determining that the one or more modified values for the respective one or more access credentials comply with the modified current state of the set of requirements, authorising the access credential modification request; and responsive to determining that the one or more modified values for the respective one or more access credentials do not comply with the modified current state of the set of requirements, refusing the access credential modification request.

In some embodiments, responsive to authorising the access credential modification request, the method comprises transmitting, to the event logging engine, a credentials modification request comprising the one or more modified access credential values to cause the event logging engine to store the modified values in an event log associated with the user. The proposed set of requirements may comprise a first requirement that at least one of the one or more of the access credentials values cannot have been used as a value for a threshold number of previous access credentials. The proposed set of requirements may comprise a second requirement that at least one of the one or more of the access credentials values cannot have been used within a predetermined period of time. The one or more parameter values may comprise one or more of: (i) a threshold number of previous access credentials; and (ii) a predetermined period of time.

Some embodiments relate to a computing implemented method comprising: receiving, from an authorisation server, an access credentials modification request to modify one or more access credentials associated with a user, the access credentials modification request comprising one or more modified access credentials values; creating a first event object comprising the one or more modified access credentials values; and appending the first event object to a first event log.

Some embodiments relate to a computing implemented method comprising: receiving, from an authorisation server, an access credentials read request associated with a user, the access credentials read request comprising one or more access credential identifiers; traversing a first event log associated with the user to determine one or more access credential values for the respective access credential identifiers in the first event log; transmitting, to the authorisation server, the one or more access credential values; creating a first event object for recording an occurrence of the access credentials read request; and appending the second event object to the second event log. The second event log may be the first event log, or may be a different event log to the first event log.

Some embodiments relate to a computer-implemented method comprising: receiving, by an authorisation server, a subscription from an event logging engine to receive event notifications associated with access credential requests for a user; receiving, by an authorisation server, an access credentials authorisation request associated with a user, the access credentials authorisation request comprising one or more access credential identifiers and associated access credential values; transmitting, to a database comprising one or more stored access credential value for the respective one or more access credentials of the user, an access credentials read request, the access credentials read request comprising the one or more access credential identifiers; receiving, by the authorisation server, the one or more stored access credential values; and transmitting, to the event logging engine, an event notification indicative of an occurrence of the access credentials authorisation request.

In some embodiments, responsive to determining, by the authorisation server, that the one or more stored access credential values correspond with the respective one or more credential values of the access credentials authorisation request, the method comprises authorising the access credentials authorisation request; and responsive to determining, by the authorisation server, that the one or more stored access credential values do not correspond with the respective one or more credential values of the access credentials authorisation request, denying the access credentials authorisation request.

The event notification may comprise an indication of whether the access credentials authorisation request was authorised or denied.

In some embodiments, responsive to authorising the access credentials authorisation request, the method comprises transmitting, by the authorisation server, an authorisation token to a computing device to allow the computing device to access a resource.

Some embodiments relate to a computer-implemented method comprising: receiving, by an authorisation server, a subscription from an event logging engine to receive event notifications associated with access credential requests for a user; receiving, by an authorisation server, an access credentials modification request associated with a user, the access credentials modification request comprising one or more current access credential values and one or more modified access credential values; transmitting, to a database comprising one or more stored access credential value for the respective one or more access credentials of the user, an access credentials read request, the access credentials read request comprising one or more access credential identifiers; receiving, by the authorisation server, the one or more stored access credential values; responsive to determining that the one or more stored access credential values correspond with the one or more current access credential values, transmitting, to the event logging engine, an access credentials write request associated with the user, the access credentials write request comprising the one or more modified access credential values; and responsive to determining that the one or more stored access credential values do not correspond with the one or more current access credential values, transmitting, to the event logging engine, an event notification indicative of an occurrence of a failed attempt to modify access credentials.

In some embodiments, wherein responsive to determining that the one or more stored access credential values correspond with the one or more current access credential values, the method comprises transmitting, to the event logging engine, an event notification indicative of an occurrence of a successful attempt to modify access credentials.

The method may further comprise causing modification of the one or more stored access credential values for the respective one or more access credentials in the database based on the respective one or more modified access credentials.

The method may further comprise receiving, at the authorisation server, a first request to modify a current state of a set of requirements for authorising modifications to access credentials, the request comprising a proposed set of requirements; modifying the current state of the set of requirements to the proposed set of requirements; and transmitting a rebuild instruction to the database to cause the database to construct one or more new stored access credential values based on an event log maintained by the event logging engine, the rebuild instruction comprising one or more parameters derived from the modified current set of requirements. The database may be a mutable data structure. The mutable data structure may be a data structure, such as an SQL data structure. The one or more access credentials may comprise one or more of: user name; user identifier; password; date; time; and location.

Some embodiments relate to a computer-implemented method comprising: subscribing to receive, by an event logging engine, event notifications associated with access credential requests for a user; for each event notification received: creating a respective event object for the event notification, the event object comprising information derived from the event notification; and appending the respective event object to the event log associated with the user; receiving, from the authorisation server, a historical record request associated with the user; replaying an event stream of the event log to generate an ordered list of information associated with access credential requests for the user.

The method may further comprise providing, to the authorisation server, the ordered list; and extracting from the ordered list, one or more features for outputting on a user interface of a computing device. The method may further comprise extracting from the ordered list, one or more features for outputting on a user interface of a computing device; and providing the extracted features to the authorisation server.

In some embodiments, the access credential requests for a user may relate to one or more of: i) requests for modifying access credentials; ii) requests for modifying access credential requirements; and iii) requests for verifying access credentials.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform any one of the described methods.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting example only with reference to the accompanying drawings, in which.

DESCRIPTION OF EMBODIMENTS

Described embodiments relate to systems, computer-implemented methods, non-transitory computer-readable storage medium, and computer programs for managing access credential requests.

Figure 1A:
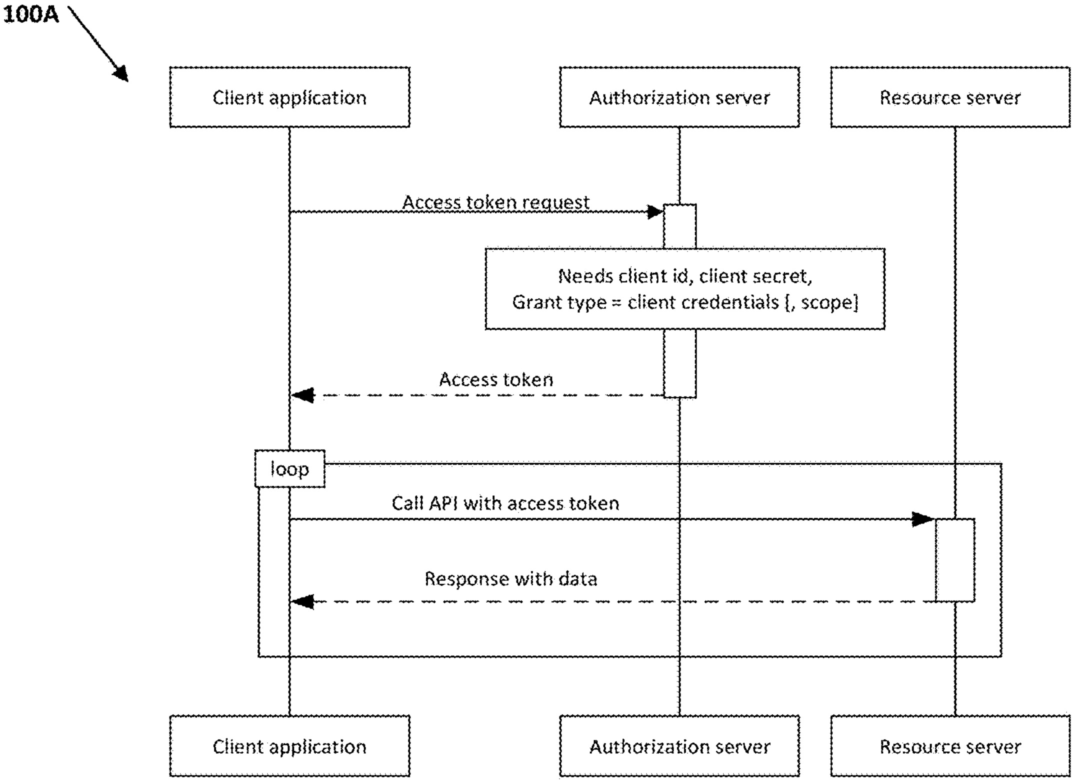
FIG. 1A is an example client credential grant flow for providing a client application with access to a resource server.

An example client credential grant flow 100A is illustrated in FIG. 1A. A client application, as may for example be deployed on a computing device (such as computing device 204 of FIG. 2), transmits an access token request to an authorisation server (such as authorisation server 202 of FIG. 2). In response, the authorisation server provides an access token to the client application. The client application then calls an Application Programming Interface (API) of a resource server with the access token to secure access to requested data.

Figure 1B:
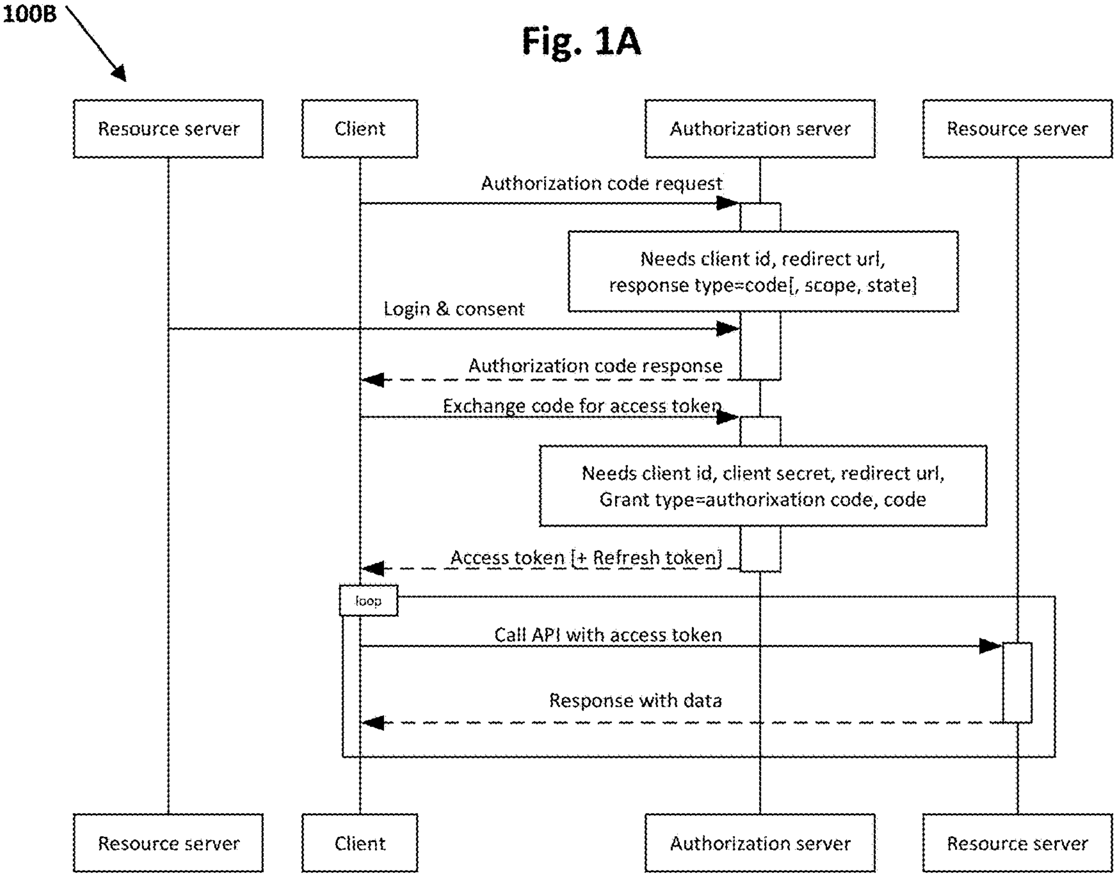
FIG. 1B is an example authorisation code grant flow for providing a client application with access to a resource server.

An example of an authorisation code grant flow 100B is depicted in FIG. 1B. A client application, as may for example be deployed on a computing device (such as computing device 204 of FIG. 2) transmits an authorisation request to an authorisation server (such as authorisation server system 202 (or authentication server system) of FIG. 2). A user provides access credentials to the authorisation server. The authorisation server is configured to verify the user credentials, and responsive to verifying the user credentials, the authorisation server provides an authorisation code response to the client application. The client application requests to exchange the authorisation code for an access token, and as per FIG. 1A, the authorisation server provides the client application with the access token (or a refresh token), and the client application uses the access token to establish a session with a resource server.

Described embodiments relate to the use of eventing or event sourcing to facilitate or manage access credential requests for authorisation servers. Event sourcing is an architectural approach which is configured to keep track not only of a current state of a system, but also of an entire sequence of state transitions, or history of state transitions (i.e. events) that led to the current state. The events are the "source of truth" of the system from which the current state, or any past state is inferred.

Some embodiments relate to an event logging engine which subscribes to event notifications associated with access credential requests for a user, such as requests to authorise access credentials and/or requests to change access credentials. On receipt of an event notification, the event logging engine may be configured to create an event object for the event notification (and comprising information derived from the event notification) and append the event object to an event log associated with the user.

The event log comprises one or more event objects, linked in time sequence. The event log represents a historical record (which may be in the form of an ordered list) of prior state transitions or modifications to one or more access credentials associated with the user. The event log may be immutable; in other words, the event objects are not updated or changed in any way once they have been appended to the event log.

In some embodiments, the event logging engine may receive a request from an authorisation server to modify access credential(s) associated with a user, or a request to read or verify access credentials associated with a user or a request for historical state transitions or events associated with a user, for example. The event logging engine may traverse the event log, or replay the event stream to determine the required information and provide a response to the authorisation server.

Access credential or login systems that use mutable data structures as a data store (i.e., non-eventing data stores) for access credential or login data may not support post-hoc (post data storage) feature design and implementation. For example, changes in front-end design or access credential requirements, such as password history rules, cannot be accommodated without backend work. For example, it would need to be known in advance how much login history will want to be shown, or how many previous passwords a user cannot use again.

With non-eventing data stores, such use cases need to be anticipated and accommodated when designing non-eventing data stores at the outset, or the design of the non-eventing data store needs to be updated to accommodate them. This requires additional upfront understanding and work to make sure any data required is captured from the beginning to use later when the features are added, and/or modification to the system and database design when the feature is being added meaning no history of data is available for features that require history to work effectively.

With eventing or event stores as the data store for, or supporting, such access credential features, with no additional forethought or work, a full history of data that may be required is captured in the event stream for the user by the nature of how the described event logging engine and event data store function. Information isn't lost since data is only ever added to the event log. All state transitions may be captured as the event logging engine subscribes to event changes. It is possible to reproduce any past state of the system. Data synchronization may be easier; since data that has been recently added can be determined, novelty can be propagated to other components of the system, which enables the building of materialised views (e.g. representing your data in search or analytics-optimized query engines such as ElasticSearch), and sending notifications (e.g. to a browser UI), etc.

Described embodiments facilitate the tracking of access credential events or requests and allow for the creation of access credential requirements or additional features on a post-hoc basis.

Figure 2:
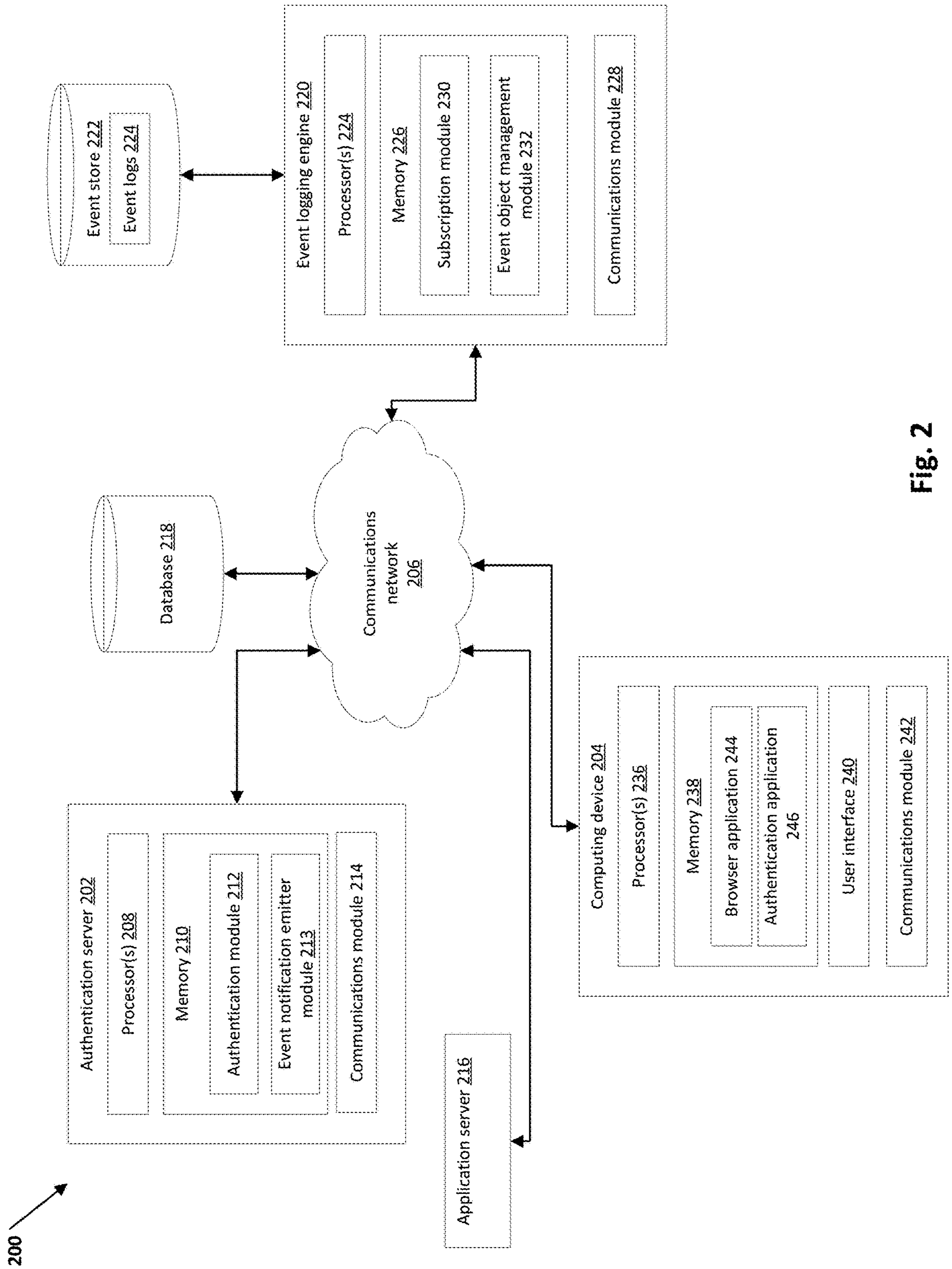
FIG. 2 is a block diagram of a system comprising an authorisation server in communication with an event logging engine across a communication network, according to some embodiments.

FIG. 2 is a schematic of a communications system 200 comprising an authorisation server or system 202 (or authentication server or system 202) in communication with one or more computing devices 204 across a communications network 206. Examples of a suitable communications network 206 include a cloud server network, wired or wireless internet connection, Bluetooth™ or other near field radio communication, and/or physical media such as USB.

The authorization server system 202 comprises one or more processors 208 and memory 210 storing instructions (e.g. program code) which when executed by the processor(s) 208 causes the authorization server system 202 to manage authentication procedures for a user, which may be an individual, a business, or entity, and/or to function according to the described methods. In some embodiments, the authentication system 200 may operate in conjunction with or support one or more servers, such as application server 216, to manage the authentication process and in some embodiments, provide a token to the user once authenticated to allow the user to access resources provided by the application servers 216. For example, the authentication system 200 may be in communication with the application server(s) 216 across the communications network 206.

The processor(s) 208 may comprise one or more microprocessors, central processing units (CPUs), application specific instruction set processors (ASIPs), application specific integrated circuits (ASICs) or other processors capable of reading and executing instruction code.

Memory 210 may comprise one or more volatile or non-volatile memory types. For example, memory 210 may comprise one or more of random access memory (RAM), read-only memory (ROM), electrically erasable programmable read-only memory (EEPROM) or flash memory. Memory 210 is configured to store program code accessible by the processor(s) 208. The program code comprises executable program code modules. In other words, memory 210 is configured to store executable code modules configured to be executable by the processor(s) 208. The executable code modules, when executed by the processor(s) 208 cause the system 202 to perform certain functionality, as described in more detail below. For example, memory 210 may comprise an authentication module 212 to manage or process requests for authentication, and/or requests for modifications to access (e.g. log in or log on credentials) and/or requests for modifications to requirements for access credentials, for example). Memory 210 may comprise an event notification emitter module 213 configured to transmit or trigger event notifications to subscribers, such as an event logging engine 220, discussed in more detail below. For example, the event notification emitter module 213 may be configured to monitor for specific events, for example, as may impact or be performed by authentication module 212 of the authorisation server, and to transmit event notifications to the subscriber.

The system 202 further comprises a network interface 214 to facilitate communications with components of the communications system 200 across the communications network 206, such as the computing device(s) 204, server(s) 216 and/or other servers (not shown), database 218 and/or an event logging engine 220, as discussed below. The network interface 214 may comprise a combination of network interface hardware and network interface software suitable for establishing, maintaining and facilitating communication over a relevant communication channel.

The communications system 200 may further comprise the database 218, which may form part of or be local to the authorisation server system 202, or may be remote from and accessible to the authorization server system 202, for example, via the communications network 206. The database 218 may be configured to store data associated with the authorization server system 202. The database 218 may be a centralised database. The database 218 may be a mutable data structure. The database 218 may be a shared data structure. The database 281 may be a data structure supported by database systems such as one or more of PostgreSQL, MongoDB, and/or ElasticSearch. The database 218 may be configured to store a current state of information or current values associated with various attributes (e.g., "current knowledge"). For example, the database may be configured to store a current state of user credentials associated with a user, such as a user name and password. In some embodiments, the database 218 may be a SQL database comprising tables with a line entry for each user credential information. For example, the line item may comprise entries for a user name, and a user password.

The communications system 200 further comprises an event logging engine 220 in communication with an event store 222. The event logging engine 220 is in communication with the authorisation server 202 across the communications network.

In some embodiments, the event store 222 may comprise one or a plurality or cluster of event logs, each configured to store one or more event streams associated with particular applications and/or systems and/or users. The event store 222 may comprise a set of event logs 224 for the authorisation server system 202. Each event log may be associated with a specific user. The event log comprises one or more event objects, linked in time sequence. The event store 222 and the event logs may be immutable; in other words, the event objects are not updated or changed in any way once they have been appended to the event log.

The event logging engine 220 comprises one or more processors 224 and memory 226 storing instructions (e.g. program code) which when executed by the processor(s) 224 causes the event logging engine 220 to operate according to the described embodiments. The event logging engine 220 may be configured to subscribe to and respond to events, such as real-time events.

The event logging engine 220 may comprise a subscription module 230 configured to subscribe to events associated with systems, servers and/or computing devices such as authorisation server 202, computing device(s) 204 and/or application or resource servers 216. In some embodiments, the subscription module 230 may be configured to subscribe to receive event notifications associated with the authorisation server 202. The subscription module 230 may be configured to receive event notifications from the event notification emitter module 213 of the authorisation server 202, for example, for events for which it has subscribed.

Memory 226 may comprise an event object management module 232. The event object management module 232 may be configured to respond to, or action, event notifications received by the subscription module 230, or other requests received by the event logging engine 220.

In some embodiments, in response to receipt of an event notification (e.g., a write request), such as a change of user credential by a user, or a verification or authentication request by a user, the event object management module 232 may create an object comprising details or information associated with or derived from the event notification, and append the event object to an event log 224 of the event store 222. The event log 224 may be associated specifically with the user.

In some embodiments, in response to a request for information, such as a read request, as, for example, may be received from the authentication module 212 of the authorisation server 202, the event object management module 232 may be configured to identify the event log 224 associated with the particular request, for example using an identifier such as a user identifier, and to replay the event stream, or instances of the event objects of the event log, to determine the relevant data. For example, the read request may relate to a request for a current password, which may be a hashed password, associated with the user. The hashed event object management module 232 may be configure to replay the event log of the user to determine the current state of the password and provide the current state of the password to the authorisation server 202 to allow the authorisation server 202 to determine if a password entered or provided by the user matches with the current state of the password as provided by the event object management module 232 of the event logging engine 220.

In some embodiments, in response to a request to store or save information, such as a write request, as, for example, may be received from the authentication module 212 of the authorisation server 202, the event object management module 232 may be configured to identify the event log 224 associated with the particular request, for example using an identifier such as a user identifier, and to create an object comprising details or information associated with or derived from the request, and append the event object to an event log 224 of the event store 222.

The database 218 may be synchronised with the event store 222. Synchronisation may occur periodically or on an ad hoc basis. In some embodiments, where a "write" request is processed by the event object management module 232, and for example, an event object is added to the event log, such as a change in a user credential, the event object management module 232 may be configured to send a notification to the database 218 to update or replace a current stored state of, or value for, the user credential with a new state or value, as reflected in the event object of the event log 224 in the event store 222.

In some embodiments, "read" requests (e.g., a request for the value of a user credential) may be diverted or transmitted to the database 218 and "write" requests (e.g., a request to change a value of a user credential) may be processed or handled by the event object management module 232. For example, the "read" requests may be diverted or transmitted to the database 218 by the authorisation server 202 or by the event logging engine 220. In some embodiments, "read" requests for a user may be associated with a "read" event stream for the user and "write" requests for a user may be associated with a "write" event stream; in other words, "read" events and "write" events may be associated with their own separate or individual event streams.

In embodiments where a current state of a set of requirements for authorising modifications to access credentials is changed or updated to a new or modified set of requirements, the database 218 may be required to construct one or more new stored access credential values based on an event log 222 maintained by the event logging engine 220. For example, the rebuild or reconstruction of the database 218 may require the database to store current and a number of previous user access credential values for each access credential, as may be required by the modified set of requirements. A rebuild instruction may be transmitted to the database 218 by the authorisation server 202 and/or by the event logging engine 220. The rebuild instruction may comprise one or more parameters derived from the modified set of requirements.

In some embodiments, despite the nature of a "read" request, the event object management module 232 may be configured to identify the event log 224 associated with the particular "read" request, for example using an identifier such as a user identifier, and to create an object comprising details or information associated with or derived from the "read" request to record the activity in the event store 222. However, where the "read" event stream is diverted to the database 218, the event object management module 232 need not provide any response to the authorisation server 202 as the authorisation server will receive the necessary response from the database 218 instead. By maintaining a synchronised database 218, and diverting or transmitting "read" events to the synchronised database, the capacity, throughput, and/or efficiency of the event logging engine 220 and/or event store 222 may be increased.

The event logging engine 220 further comprises a communications module 228 to facilitate communications with components of the communications system 200 across the communications network 206, such as the computing device(s) 204, application server(s) 216 and/or other servers (not shown), database 218 and/or the authorisation server system 202, as discussed below. The communications module 228 may comprise a combination of network interface hardware and network interface software suitable for establishing, maintaining and facilitating communication over a relevant communication channel.

The computing device 204 of system 200 comprises at least one processor 236, one or more forms of memory 238, a user interface 240 and a network interface or communications module 242.

Memory 238 may comprise volatile (e.g. RAM) and non-volatile (e.g. hard disk drive, solid state drive, flash memory and/or optical disc) storage. For example, memory 238 may store or be configured to store a number of software applications or applets executable by the processor(s) 236 to perform various device-related functions discussed herein. In some embodiments, activities or functionality performed by the computing device 204 may be reliant on program code served by a system or server, such as authorisation server 202 and executed by a browser application 244. In some embodiments, memory comprises an authentication application 246 to communicate with the authorisation server and facilitate the processing of access credential request, for example for verifying or authorising user identity and access to a resource, such as may be provided by an application server 216.

The user interface 240 may comprise at least one output device, such as a display and/or speaker, for providing an output for the computing device 204 and at least one input device, such as a touch-screen, a keyboard, mouse, microphone, video camera, stylus, push button, switch or other peripheral device that can be used for providing user input to the computing device 204. In some embodiments, the user interface 240 comprises a display, a speaker, a microphone, and/or a video camera.

The communications module 242 may comprise suitable hardware and software interfaces to facilitate wireless communication with the authorisation server 202, other servers or systems, such as application server 216, other computing devices 204, database 218 and/or event logging engine 220, for example, over a network, such as communications network 206. For example, the network interface 126 may comprise a USB port, Ethernet port, a wireless adapter or a Bluetooth module, and/or suitable hardware and software interfaces to facilitate wired communication.

Figure 3:
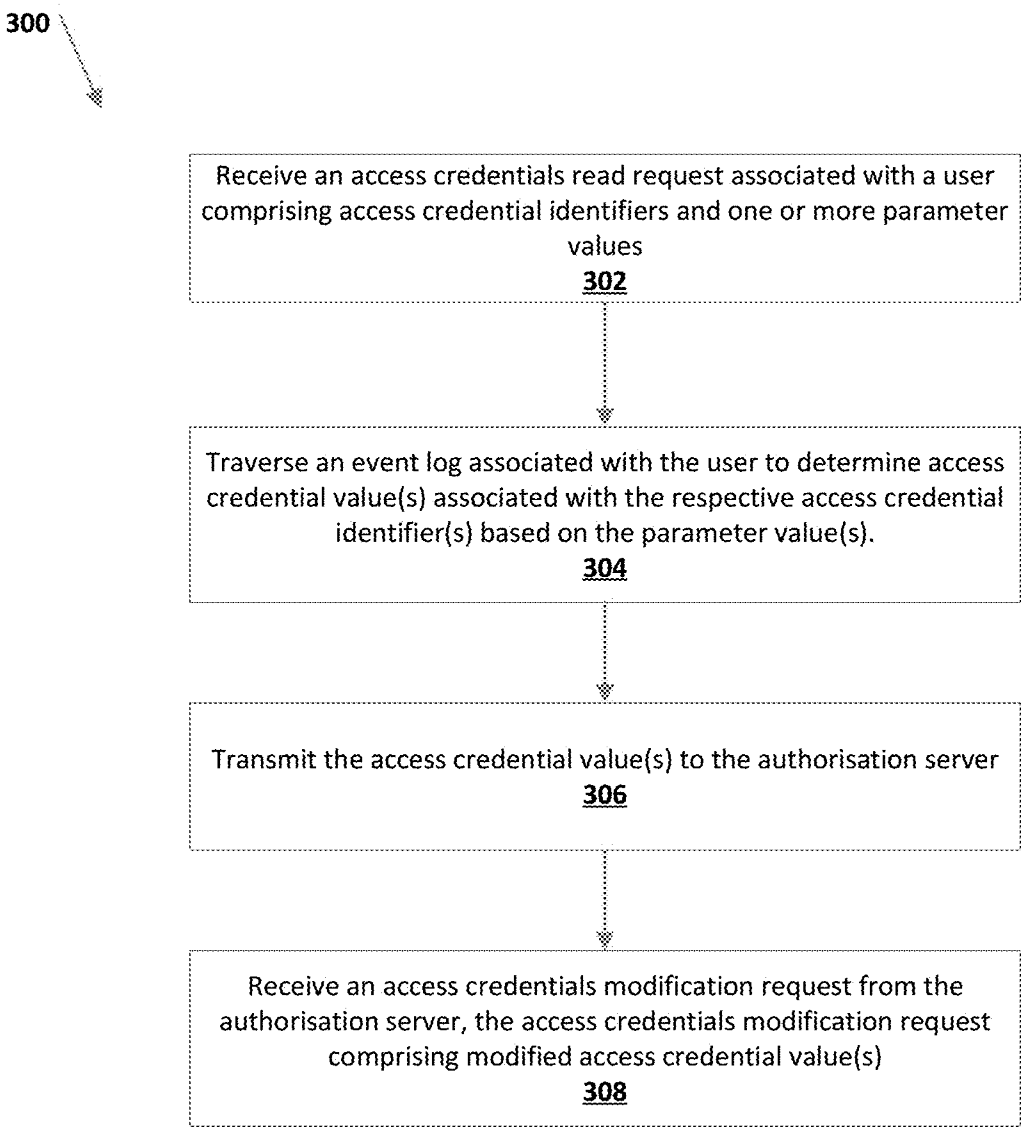
FIG. 3 is a process flow diagram of a method of managing or processing requests for modifying access credentials, the method being implemented by the event logging engine of FIG. 2, according to some embodiments.

Referring now to FIG. 3, there is shown a process flow diagram of a method 300 of managing or processing requests for modifying access credentials. Method 300 may be implemented or performed by a system, such as the event logging engine 220 of FIG. 2. In some embodiments, method 300 may be performed by a system, or combination of systems, such as the authorisation server 202 of FIG. 2, and in some embodiments, the authorisation server 202 and the event logging engine 220 of FIG. 2.

The event logging engine 220 may subscribe to receive event notifications associated with access credential requests for a user. In some embodiments, the event logging engine 220 subscribes to receive event notifications associated with "read" requests such as requests for verifying or reading access credentials. In some embodiments, the event logging engine 220 subscribes to receive event notifications associated with "write" requests such as requests for changing access credentials. In some embodiments, the event logging engine 220 subscribes to receive event notifications associated with both "read" and "write" requests. The event notification may be user specific. A separate event stream may be used for read requests for the user and a separate event stream may be used for "write" requests for the user.

Access credentials may comprise information capable of identifying a user as an authorised user. For example, access credentials may include a user name; a user identifier, a phone number, an address, a password, a date, a time; an answer to a "secret question(s)", a location, biometric data etc.

Access credential requests may comprise requests for modifying access credentials and/or requests for verifying access credentials, for example.

At 302, the event logging engine 220 receives, for example, from the authorisation server 202, an access credentials read request associated with a user. The access credentials read request may comprise one or more access credential identifiers and one or more parameter values. The parameter value(s) may be derived from a current state of a set of requirements for authorising modifications to access credentials. In some embodiments, the access credential identifier(s) and/or the parameter value(s) may be received from or retrieved from a system, server, database 218 or computing device 204 other than the authorisation server 202.

For example, the set of requirements for authorising modifications to access credential may include a rule that at least one of the one or more of the access credentials values cannot have been used as a value for a threshold number of previous access credential, and/or a rule that at least one of the one or more of the access credentials values cannot have been used within a predetermined period of time.

The parameter value(s) derived from the set of requirements may comprise a threshold number of previous access credentials, a predetermined period of time, and/or a specific range of event objects.

At 304, the event logging engine 220 traverses a first event log associated with the user to determine access credential value(s) associated with the respective one or more access credential identifiers based on the parameter value(s).

The first event log may comprise a historical record of prior modifications to one or more access credentials associated with the user, each of which occurred prior to setting of the current state of the set of requirements for authorising modifications to access credentials.

The event logging engine 220 traversing the event log 222 may comprise the event logging engine 220 replaying the event log (or event stream of the event log) to determine whether the modified value(s) comply with the current state of the requirements. For example, this may involve the event logging engine 220 replaying the event log 222 to reconstruct an ordered list of a history (or historical record) of value(s) for respective access credential(s) for the user. The ordered list may be an ordered list of, or including, hashed value(s).

In some embodiments, the event logging engine 220 replays the event log 224 in accordance with the parameter values(s) received in the access credentials read request. The event logging engine 220 may replay the event log 224 (or event stream of the event log) from a start or beginning of the event log; in other words, from the first object of the event log 224. In some embodiments, the event logging engine 220 replays the event log 224 from a specific point in time, for example, as may be specified by a timestamp associated with event objects of the event log 224, or as may be specified by an identifier of a specific object (e.g. replay all event objects after event object X).

At 306, the event logging engine 220 transmits the access credential value(s) to the authorisation server 202.

At 308, the event logging engine 220 receives an access credentials modification request from the authorisation server 202. The access credentials modification request comprises one or more modified access credential values. Responsive to receiving the access credentials modification request, the event logging engine 220 creates a first event object comprising the one or more modified access credential values, and appends the first event object to the first event log.

In some embodiments, the event logging engine 220 creates a second event object indicative of a credentials read request, and appends the second event object to a second event log associated with the user.

In some embodiments, the event logging engine 220 receives a failure notification indicative of a failed attempt to modify the one or more access credential values. In response to receiving the failure notification, the event logging engine 220 may create a third event object indicative of the failed attempt and append the third event object to a second event log associated with the user.

The first event log may be the same as the second event log, or the first event log may be different from the second event log.

Figure 4:
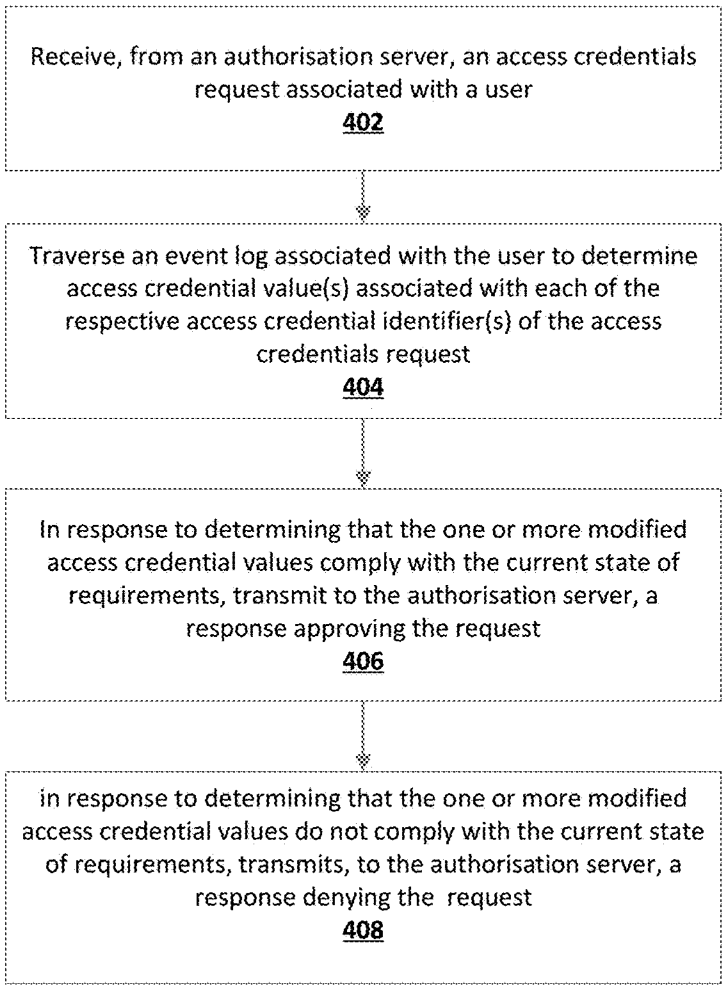
FIG. 4 is a process flow diagram of a method of managing or processing requests for modifying access credentials, the method being implemented by the event logging engine of FIG. 2, according to some embodiments.

Referring now to FIG. 4, there is shown a process flow diagram of a method 400 of managing or processing requests for modifying access credentials. Method 400 may be implemented or performed by the event logging engine 220 of FIG. 2. In some embodiments, method 300 may be performed by a system, or combination of systems, such as the authorisation server 202 of FIG. 2, and in some embodiments, the authorisation server 202 and the event logging engine 220 of FIG. 2.

The event logging engine 220 may subscribe to receive event notifications associated with access credential requests for a user. In some embodiments, the event logging engine 220 subscribes to receive event notifications associated with "read" requests such as requests for verifying or reading access credentials. In some embodiments, the event logging engine 220 subscribes to receive event notifications associated with "write" requests such as requests for changing access credentials. In some embodiments, the event logging engine 220 subscribes to receive event notifications associated with both "read" and "write" requests. The event notification may be user specific. A separate event stream may be used for read requests for the user and a separate event stream may be used for "write" requests for the user.

Access credentials may comprise information capable of identifying a user as an authorised user. For example, access credentials may include a user name; a user identifier, a phone number, an address, a password, a date, a time; an answer to a "secret question(s)", a location, biometric data etc.

Access credential requests may comprise requests for modifying access credentials and/or requests for verifying access credentials, for example.

At 402, the event logging engine 220 receives, for example, from the authorisation server 202, an access credentials request associated with a user. The access credentials request may comprise one or more access credential identifiers, one or more associated modified access credential values, and a current state of the set of requirements for authorising modifications to access credentials. In some embodiments, the access credential identifier(s), the associated modified access credential value(s), and/or the current state of the set of requirements for authorising modifications to access credentials may be received from or retrieved from a system, server, database 218 or computing device 204 other than the authorisation server 202.

At 404, the event logging engine 220 traverses a first event log associated with the user to determine one or more access credential values associated with each of the respective access credential identifier(s). The access credential value(s) may be determined based on one or more parameter values derived from the current state of the set of requirements for authorising modifications to access credentials. In some embodiments, the access credentials request comprises the parameter value(s). In some embodiments, the event logging engine 220 determines the parameter value(s) from the current state of the set of requirements for authorising modifications to access credentials. The event logging engine 220 determines whether the modified access credential value(s) comply with the current state of requirements.

At 406, in response to determining that the one or more modified access credential values comply with the current state of requirements, the event logging engine 220 transmits, to the authorisation server, a response approving the credential modification request, creates a first event object comprising the modified access credential value(s); and appends the first event object to the first event log.

At 408, in response to determining that the one or more modified access credential values do not comply with the current state of requirements, the event logging engine 220 transmits, to the authorisation server, a response denying the credential modification request.

In some embodiments, in response to determining that the one or more modified access credential values do not comply with the current state of requirements, the event logging engine 220 creates a second event object indicative of the failed attempt to modify the access credentials and appends the second event object to a second event log associated with the user.

The first event log may be the same as the second event log, or the first event log may be different from the second event log.

Figure 5:
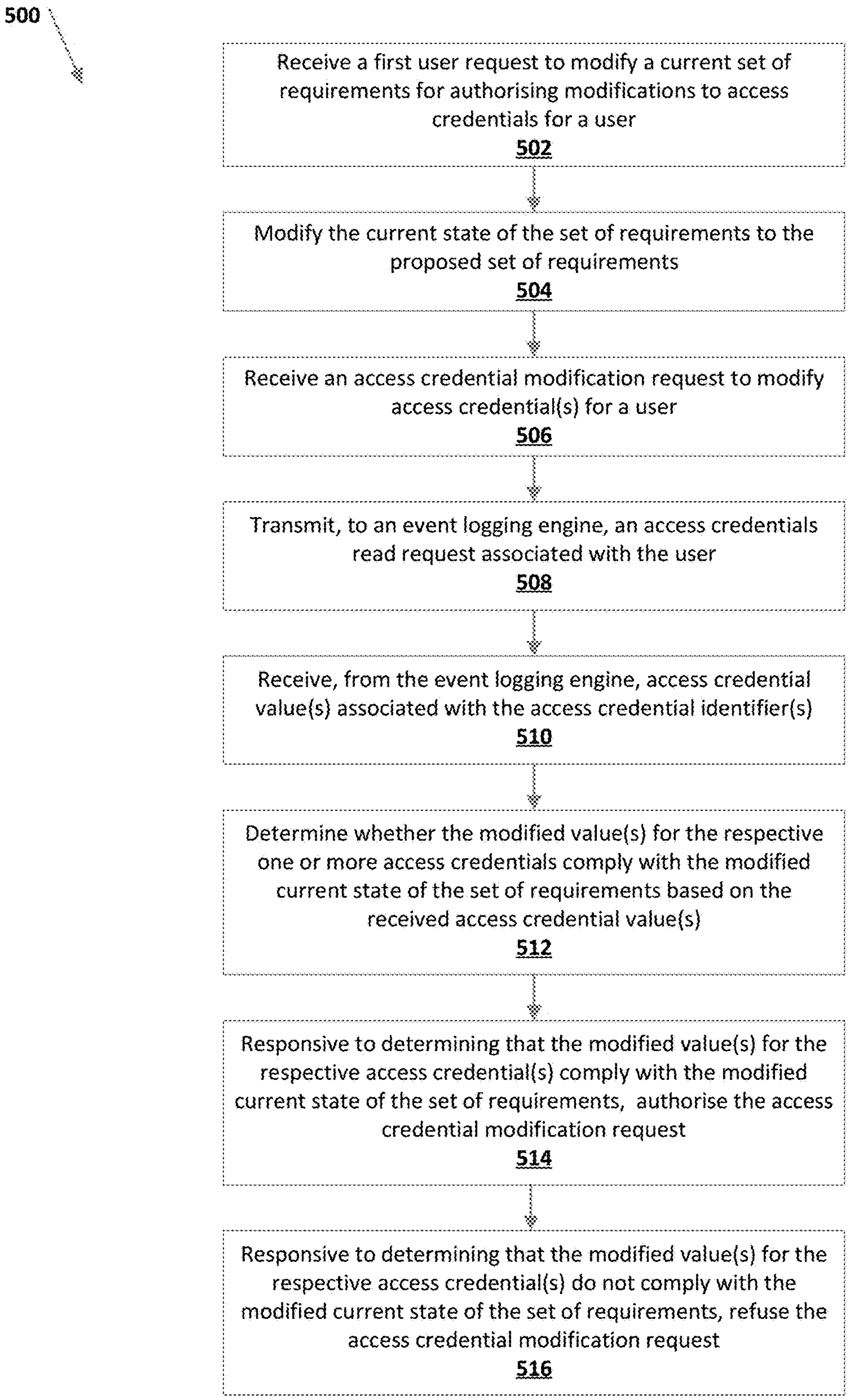
FIG. 5 is a process flow diagram of a method of managing or processing requests for modifying access credentials, the method being implemented by the authorisation server of FIG. 2, according to some embodiments.

Referring now to FIG. 5, there is shown a process flow diagram of a method 400 of managing or processing requests for modifying access credentials. Method 500 may be implemented or performed by the authorisation server 202 of FIG. 2. In some embodiments, method 300 may be performed by a system, or combination of systems, such as the event logging engine 220 of FIG. 2, and in some embodiments, the authorisation server 202 and the event logging engine 220 of FIG. 2.

At 502, the authorisation server 202 receives a first user request to modify a current set of requirements for authorising modifications to access credentials for a user. The user request may comprise a proposed set of requirements for authorising modifications to access credentials.

At 504, the authorisation server 202 modifies or sets the current state of the set of requirements to the proposed set of requirements.

At 506, the authorisation server 202 receives an access credential modification request to modify one or more access credentials for a user, for accessing a resource, for example. The access credential modification request may comprise one or more access credential identifiers and associated and associated modified values for the respective one or more access credentials.

At 508, the authorisation server 202 provides or transmits to an event logging engine 220, an access credentials read request associated with the user. The access credentials read request may comprise the access credential identifier(s) and one or more parameter values. The parameter value(s) may be derived from the modified current state of the set of requirements.

In some embodiments, the event logging engine 220 traverses a first event log associated with the user to determine the access credential values associated with each of the respective access credential identifier(s).

At 510, the authorisation server 202 receives, from the event logging engine 220, access credential value(s) associated with the one or more access credential identifiers.

At 512, the authorisation server 202 determines whether the modified value(s) for the respective one or more access credentials comply with the modified current state of the set of requirements based on the received access credential value(s).

At 514, responsive to determining that the modified value(s) for the respective access credential(s) comply with the modified current state of the set of requirements, the authorisation server 202 authorises the access credential modification request.

In some embodiments, in response to authorising the access credential modification request, the authorisation server 202 transmits, to the event logging engine, a credentials modification request comprising the modified access credential value(s) to cause the event logging engine to store the modified values in an event log associated with the user.

At 516, responsive to determining that the modified value(s) for the respective one or more access credentials do not comply with the modified current state of the set of requirements, refusing the access credential modification request. The authorisation server 202 may prompt the user at the computing device 204 to input different value(s) for the user credential(s).

Figure 6:
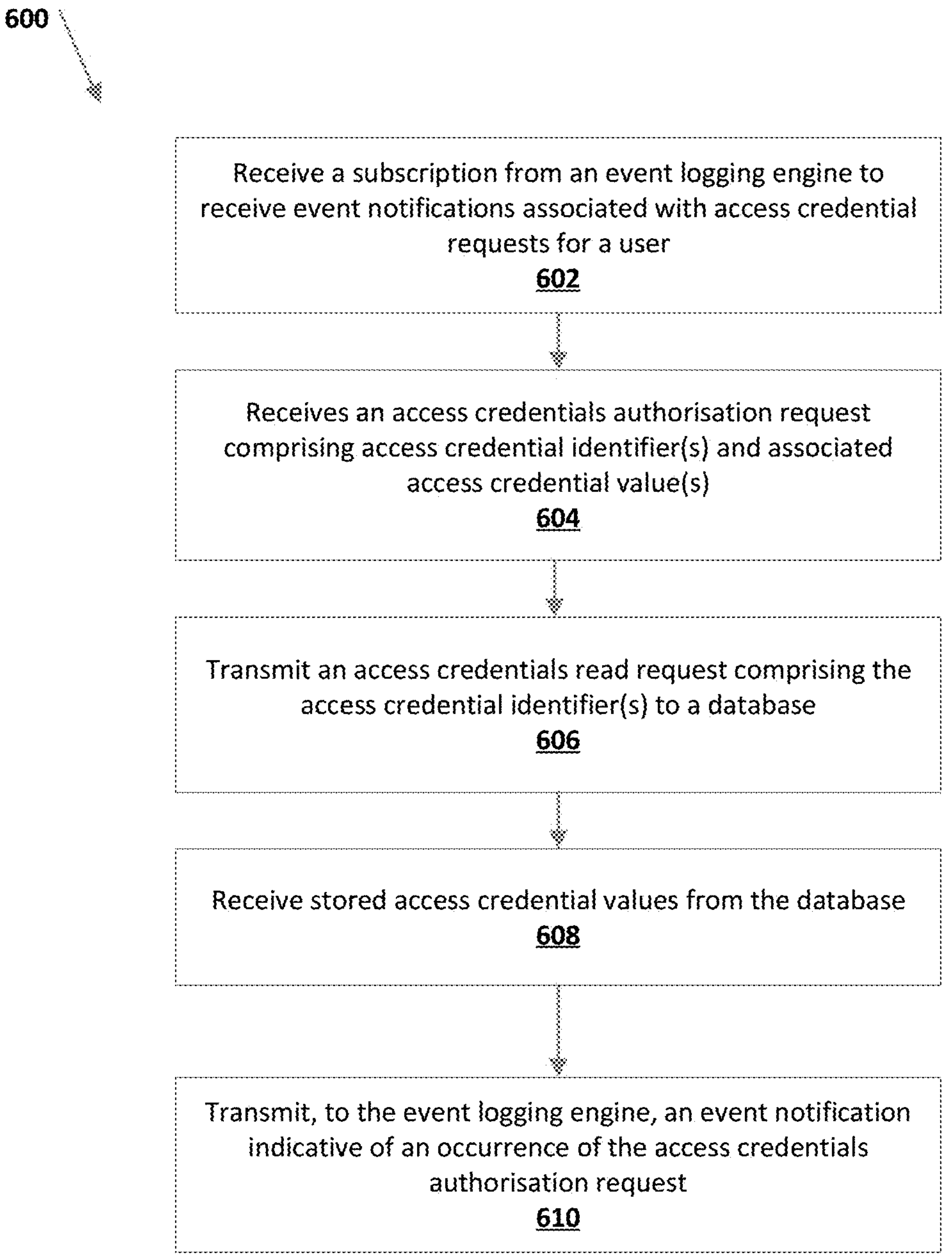
FIG. 6 is a process flow diagram of a method of managing authentication requests, according to some embodiments.

Referring now to FIG. 6, there is shown a process flow diagram of a method 500 of managing access credential authorisation requests, according to some embodiments. Method 600 may be implemented or performed by a system, such as the authorisation server 202 of FIG. 2. In some embodiments, method 300 may be performed by a system, or combination of systems, such as the event logging engine 220 of FIG. 2, and in some embodiments, the authorisation server 202 and the event logging engine 220 of FIG. 2.

At 602, the authorisation server 202 receives a subscription from an event logging engine 220 to receive event notifications associated with access credential requests for a user.

At 604, the authorisation server 202 receives an access credentials authorisation request for example, seeking approval to access a resource. The access credentials authorisation request may comprise one or more access credential identifiers and associated access credential values.

At 606, the authorisation server 202, transmits to a database 218, an access credentials read request. The access credentials read request may comprise the access credential identifier(s). The database 218 may comprise one or more stored access credential values for the respective access credential(s) of the user. The database may include a mutable data structure. The mutable data structure may be an SQL data structure.

At 608, the authorisation server 202 receives the stored access credential values from the database 218.

At 610, the authorisation server 202 transmits, to the event logging engine, an event notification indicative of an occurrence of the access credentials authorisation request. For example, the event notification may comprise an indication of whether the access credentials authorisation request was authorised or denied.

In some embodiments, in response to determining that the stored access credential value(s) correspond with the respective credential value(s) of the access credentials authorisation request, the authorisation server 202 authorises the access credentials authorisation request. In some embodiments, the authorisation server 202 provides an authorisation token to a computing device to allow the computing device to access a resource.

In response to determining that the stored access credential value(s) do not correspond with the respective credential value(s) of the access credentials authorisation request, the authorisation server 202 denies the access credentials authorisation request.

Figure 7:
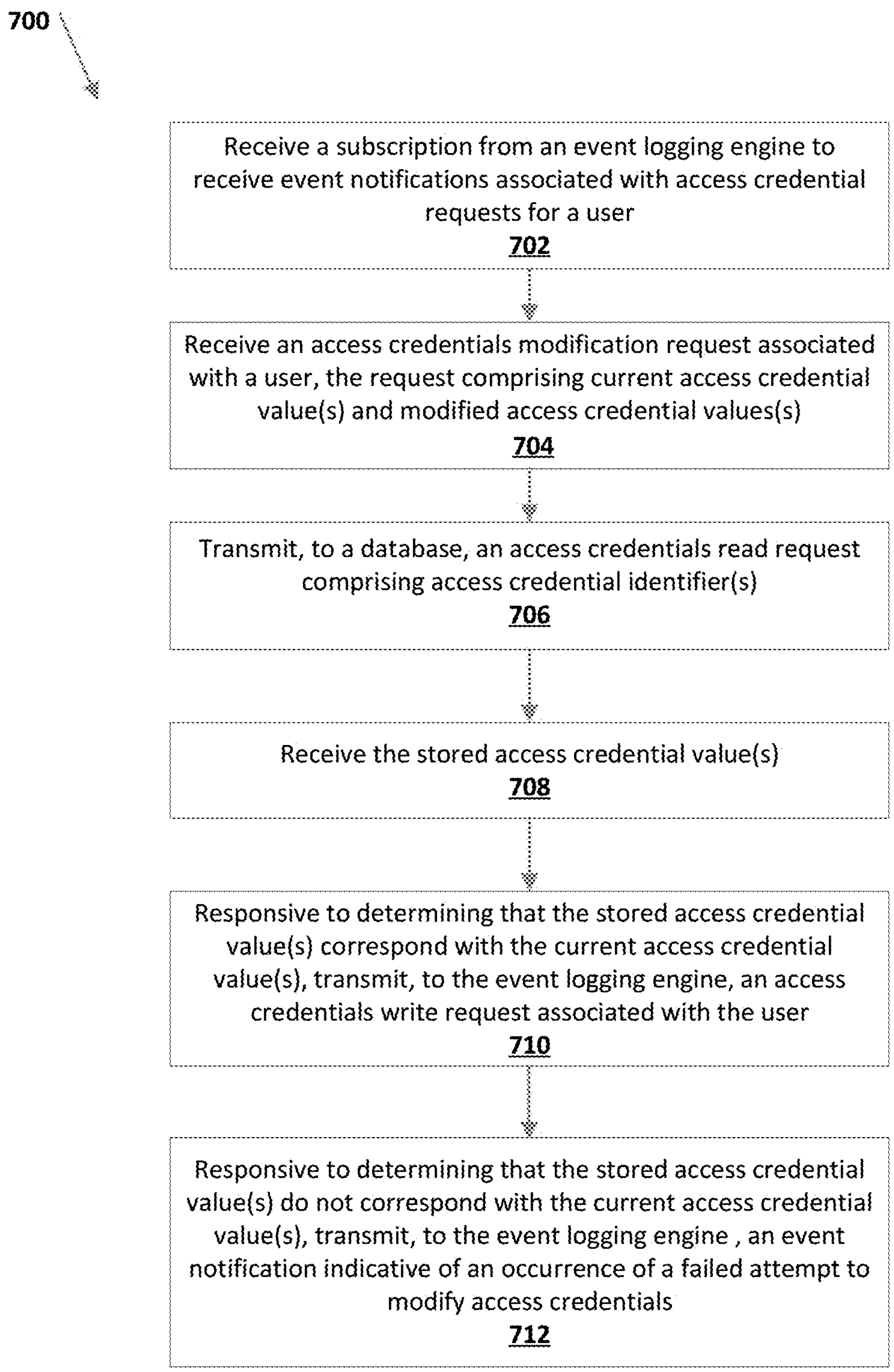
FIG. 7 is a process flow diagram of a method of managing access credentials modification requests, according to some embodiments.

Referring now to FIG. 7, there is shown a process flow diagram of a method 700 of managing access credentials modification requests, according to some embodiments. Method 700 may be implemented or performed by a system, such as the authorisation server 202 of FIG. 2. In some embodiments, method 300 may be performed by a system, or combination of systems, such as the event logging engine 220 of FIG. 2, and in some embodiments, the authorisation server 202 and the event logging engine 220 of FIG. 2.

At 702, the authorisation server 202 receives a subscription from an event logging engine 220 to receive event notifications associated with access credential requests for a user.

At 704, the authorisation server 202 receives an access credentials modification request associated with a user. The access credentials modification request may comprise one or more current access credential values and one or more modified access credential values. In some embodiments, the authorisation server 202 first receives an access credentials read request comprising the access credential value(s) and subsequently, for example, once the read request has been received and approved by the authorisation server 202, the authorisation server 202 receives a modification request comprising modified access credential value(s).

At 706, the authorisation server 202 transmits, to a database, an access credentials read request comprising one or more access credential identifiers. The database comprises one or more stored access credential values for the respective access credentials of the user.

At 708, the authorisation server 202 receives the one or more stored access credential values.

At 710, responsive to determining that the stored access credential value(s) correspond with the current access credential value(s), the authorisation server 202 transmits, to the event logging engine 220, an access credentials write request associated with the user. The access credentials write request may comprise the one or more modified access credential values.

In some embodiments, responsive to determining that the stored access credential value(s) correspond with the current access credential value(s), the authorisation server 202 transmits, to the event logging engine 220, an event notification indicative of an occurrence of a successful attempt to modify access credentials.

At 712, responsive to determining that the stored access credential value(s) do not correspond with the current access credential value(s), the authorisation server 202 transmits, to the event logging engine 220, an event notification indicative of an occurrence of a failed attempt to modify access credentials.

In some embodiments, the authorisation server 202 receives a first request to modify a current state of a set of requirements for authorising modifications to access credentials. The request may comprise a proposed set of requirements. The authorisation server 202 modifies the current state of the set of requirements to the proposed set of requirements, and transmits a rebuild instruction to the database 218 to cause the database 218 to construct one or more new stored access credential values based on an event log 222 maintained by the event logging engine 220. The rebuild instruction may comprise one or more parameters derived from the modified current set of requirements.

Figure 8:
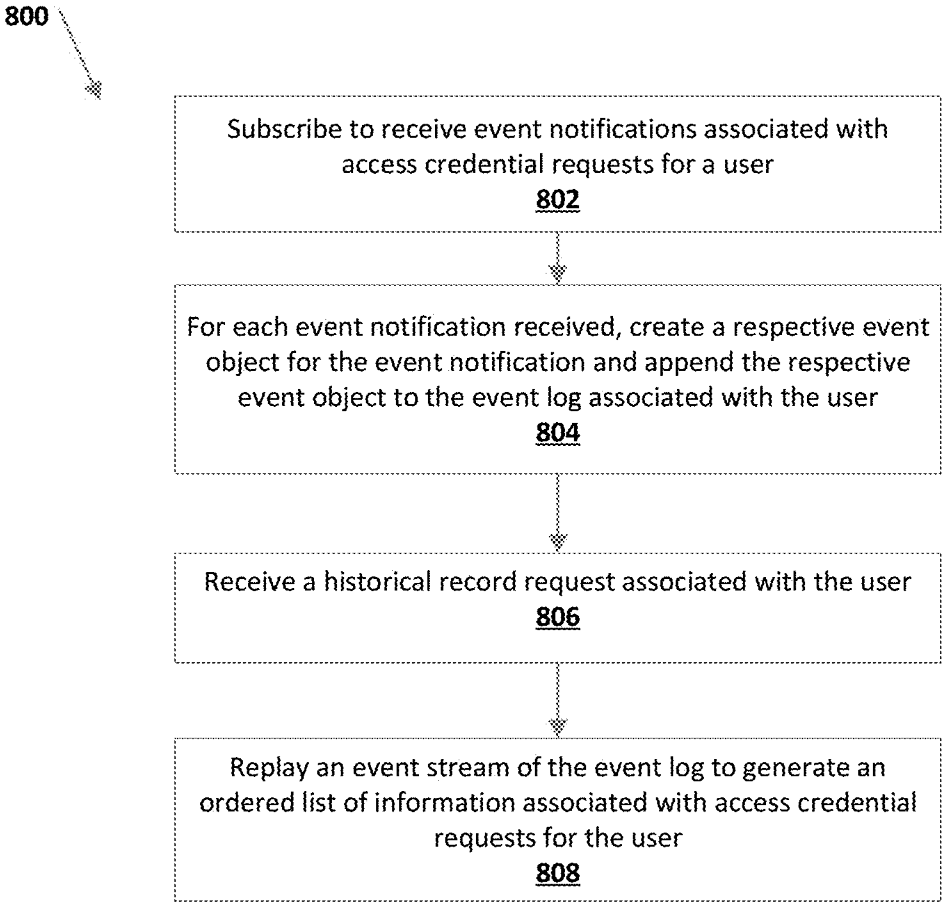
FIG. 8, is a process flow diagram of a method of managing access credential requests, according to some embodiments.

Referring now to FIG. 8, there is shown a process flow diagram of a method 800 of managing access credential requests, according to some embodiments. Method 800 may be implemented or performed by a system, such as the event logging engine 220 of FIG. 2. In some embodiments, method 300 may be performed by a system, or combination of systems, such as the authorisation server 202 of FIG. 2, and in some embodiments, the authorisation server 202 and the event logging engine 220 of FIG. 2.

At 802, the event logging engine 220 subscribes to receive event notifications associated with access credential requests for a user. For example, the event logging engine 220 may subscribe to the authorisation server 202.

At 804, for each event notification received, the event logging engine 220 creates a respective event object for the event notification and appends the respective event object to the event log associated with the user. The event object may comprise information derived from the event notification.

At 806, the event logging engine 220 receives a historical record request associated with the user. For example, the historical record request may be received from the authorisation server.

At 808, the event logging engine 220 replays an event stream of the event log to generate an ordered list of information associated with access credential requests for the user.

In some embodiments, the event logging engine 220 provides the ordered list to the authorisation server 202. The authorisation server 202 may extract from the ordered list, one or more features for outputting on the user interface 240 of the computing device 204. In some embodiments, the event logging engine 220 extracts the feature(s) for outputting on or to the user interface 240 of the computing device 204, and may, for example, provide the extracted features to the authorisation server 202.

The extracted feature(s) may be used to provide specific information or functionality to the user interface that may not have been conceived of or deployed when at least some of the event objects of the ordered list of information associated with access credential requests for the user were created. In other words, by using the event logging engine and event store to create and store event objects associated with event notifications, an entire history of the event notifications associated with access credential requests of the user can be availed of, and from which features may be extracted to populate or rely on for new features and/or functionality provided to the user via the user interface 240.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method comprising:

receiving, at an authorisation server, a first request to modify a current state of a set of requirements for authorising modifications to access credentials, the request comprising a proposed set of requirements;

modifying the current state of the set of requirements to the proposed set of requirements;

receiving, at the authorisation server, an access credential modification request, the access credential modification request comprising one or more access credential identifiers and associated modified access credential values;

providing, to an event logging engine, an access credentials read request associated with a user, the access credentials read request comprising the one or more access credential identifiers and one or more parameter values, wherein the one or more parameter values are derived from modified current state of the set of requirements;

receiving, from the event logging engine, one or more access credential values associated with the one or more access credential identifiers;

determining, by the authorisation server, whether the one or more modified values for the respective one or more access credentials comply with the modified current state of the set of requirements based on the received one or more access credential values;

responsive to determining that the one or more modified values for the respective one or more access credentials comply with the modified current state of the set of requirements, authorising the access credential modification request; and responsive to determining that the one or more modified values for the respective one or more access credentials do not comply with the modified current state of the set of requirements, refusing the access credential modification request.

2. The method of claim 1, wherein responsive to authorising the access credential modification request, transmitting, to the event logging engine, a credentials modification request comprising the one or more modified access credential values to cause the event logging engine to store the modified values in an event log associated with the user.

3. The method of claim 1, wherein the proposed set of requirements comprises a first requirement that at least one of the one or more of the access credentials values cannot have been used as a value for a threshold number of previous access credentials.

4. The method of claim 1, wherein the proposed set of requirements comprises a second requirement that at least one of the one or more of the access credentials values cannot have been used within a predetermined period of time.

5. The method of claim 1, wherein the one or more parameter values comprise one or more of: (i) a threshold number of previous access credentials; and (ii) a predetermined period of time.

6. The method of claim 1, further comprising:

traversing, by the event logging engine, a first event log associated with the user to determine the one or more access credential values associated with each of the respective one or more access credential identifier.

7. The method of claim 1, wherein the event logging engine comprises a first event log associated with the user and wherein the first event log comprises a historical record of prior modifications to one or more access credentials associated with the user, each of which occurred prior to setting of the current state of the set of requirements for authorising modifications to access credentials.

8. The method of claim 1, wherein responsive to determining that the one or more modified values for the respective one or more access credentials do not comply with the modified current state of the set of requirements, prompting the user at a computing device to input one or more different modified values.

9. The method of claim 1, further comprising:

transmitting a rebuild instruction to a database to cause the database to construct one or more new stored access credential values based on an event log maintained by the event logging engine, the rebuild instruction comprising one or more parameters derived from the modified current set of requirements.

10. The method of claim 9, further comprising:

diverting read requests from the event logging engine to the database.

11. The method of claim 10, wherein the database is a mutable data structure or an SQL data structure.

12. The method of claim 1, wherein the one or more access credentials comprise one or more of: user name; user identifier; password; date; time; and location.

13. The method of claim 7 wherein the first event log is immutable.

14. A system comprising:

one or more processors; and memory comprising computer executable instructions, which when executed by the one or more processors, cause the system to perform operations including:

receiving, at an authorisation server, a first request to modify a current state of a set of requirements for authorising modifications to access credentials, the request comprising a proposed set of requirements;

modifying the current state of the set of requirements to the proposed set of requirements;

receiving, at the authorisation server, an access credential modification request, the access credential modification request comprising one or more access credential identifiers and associated modified access credential values;

providing, to an event logging engine, an access credentials read request associated with a user, the access credentials read request comprising the one or more access credential identifiers and one or more parameter values, wherein the one or more parameter values are derived from modified current state of the set of requirements;

receiving, from the event logging engine, one or more access credential values associated with the one or more access credential identifiers;

determining, by the authorisation server, whether the one or more modified values for the respective one or more access credentials comply with the modified current state of the set of requirements based on the received one or more access credential values;

responsive to determining that the one or more modified values for the respective one or more access credentials comply with the modified current state of the set of requirements, authorising the access credential modification request; and responsive to determining that the one or more modified values for the respective one or more access credentials do not comply with the modified current state of the set of requirements, refusing the access credential modification request.

15. The system of claim 14, wherein the event logging engine maintains a first event log associated with the user and wherein the first event log comprises a historical record of prior modifications to one or more access credentials associated with the user, each of which occurred prior to setting of the current state of the set of requirements for authorising modifications to access credentials.

16. The system of claim 14, wherein the operations further include:

transmitting a rebuild instruction to a database to cause the database to construct one or more new stored access credential values based on an event log maintained by the event logging engine, the rebuild instruction comprising one or more parameters derived from the modified current set of requirements.

17. The system of claim 16, wherein the operations further include:

diverting read requests from the event logging engine to the database.

18. A non-transitory computer-readable storage medium storing instructions that, when executed by a computer, cause the computer to perform operations including:

receiving, at an authorisation server, a first request to modify a current state of a set of requirements for authorising modifications to access credentials, the request comprising a proposed set of requirements;

modifying the current state of the set of requirements to the proposed set of requirements;

receiving, at the authorisation server, an access credential modification request, the access credential modification request comprising one or more access credential identifiers and associated modified access credential values;

providing, to an event logging engine, an access credentials read request associated with a user, the access credentials read request comprising the one or more access credential identifiers and one or more parameter values, wherein the one or more parameter values are derived from modified current state of the set of requirements;

receiving, from the event logging engine, one or more access credential values associated with the one or more access credential identifiers;

determining, by the authorisation server, whether the one or more modified values for the respective one or more access credentials comply with the modified current state of the set of requirements based on the received one or more access credential values;

responsive to determining that the one or more modified values for the respective one or more access credentials comply with the modified current state of the set of requirements, authorising the access credential modification request; and responsive to determining that the one or more modified values for the respective one or more access credentials do not comply with the modified current state of the set of requirements, refusing the access credential modification request.

19. The non-transitory computer-readable storage medium of claim 18, wherein the event logging engine maintains a first event log associated with the user and wherein the first event log comprises a historical record of prior modifications to one or more access credentials associated with the user, each of which occurred prior to setting of the current state of the set of requirements for authorising modifications to access credentials.

20. The non-transitory computer-readable storage medium of claim 18, wherein the computer-readable storage medium further cause the computer to perform transmitting a rebuild instruction to a database to cause the database to construct one or more new stored access credential values based on an event log maintained by the event logging engine, the rebuild instruction comprising one or more parameters derived from the modified current set of requirements.

* * * * *